Figure 1:
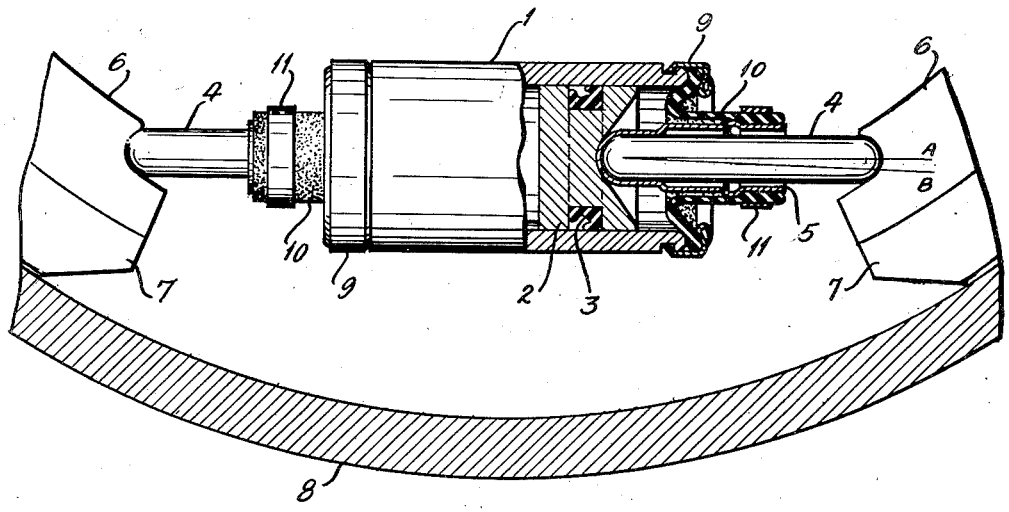

Feb. 24, 1953         W. R. FREEMAN              2,629,463
    HEAT DISSIPATING WHEEL-CYLINDER CONSTRUCTION
       FOR HYDRAULIC AUTOMOTIVE VEHICLE BRAKES
                 Filed Aug. 16, 1948

INVENTOR:
Walter R. Freeman,

By Carr + Carr + Gravely,
       HIS ATTORNEYS.

Patented Feb. 24, 1953

2,629,463

UNITED STATES PATENT OFFICE 2,629,463

HEAT DISSIPATING WHEEL CYLINDER CONSTRUCTION FOR HYDRAULIC AUTOMOTIVE VEHICLE BRAKES

Walter Reams Freeman, University City, Mo., assignor to Wagner Electric Corporation, St. Louis, Mo., a corporation of Delaware Application August 16, 1948, Serial No. 44,514

11 Claims. (Cl. 188—152)

This invention relates to wheel cylinder constructions for hydraulic automotive vehicle brake systems of the kind wherein the brake shoe operating piston operates in an open end of the cylinder and which end has a rubber boot mounted thereon that embraces the piston actuated element for operating the brake shoe and thus prevents entry of dust or other foreign matter in said open end.

A serious practical objection to the above construction is that the heat generated by the application of the brakes is directly transmitted from the brake shoe to the rubber boot and causes rapid deterioration thereof and thus permits entry of dust or other foreign matter into the open end of the wheel cylinder and necessitates frequent replacement of the boot.

The principal object of the invention is to prevent injury to the rubber boot from the heat generated by the application of the brake. Other objects are simplicity and cheapness of construction and compactness of design.

This invention consists in interposing between the rubber boot and the piston actuated element of the brake shoe a thimble will provide an air gap therebetween that will materially reduce the transmission from the brake shoe to the boot of the heat generated by the application of the brake and thus prolong the life of the boot.

The invention also consists in maintaining a uniform air gap between the piston actuated brake shoe operating element and the boot during the relative angular movement of said element and boot from the application and release of the brake shoe.

The invention also consists in the wheel cylinder construction and in the construction, combinations and arrangements of parts hereinafter described and claimed.

Figure 2:
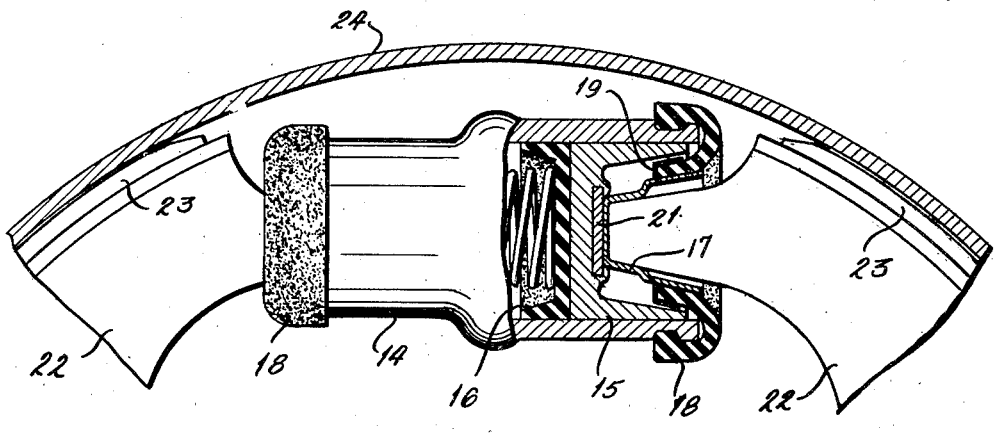

In the drawing:

Fig. 1 is an elevational view, partly in section, of a wheel cylinder and a cooperating brake shoe and drum mechanism; and Fig. 2 shows a modified construction of a wheel cylinder and a cooperating brake shoe assembly, partly in section.

The assembly comprises a wheel cylinder 1 provided with a pair of opposed pistons 2, only one of which is shown, each piston being provided with a pressure sealing piston ring 3, as is customary in the art. A cavity is formed in one end of piston 2 which receives the closed semi-spherical end of cylindrical thimble 5 within which is placed a piston rod 4, the internal diameter of the thimble being larger over the major portion of its length than it is at its closed end. Each end of the piston rod 4 has a semi-spherical end and one end of the rod snugly internally fits the closed semi-spherical end of thimble 5. The opposite end of piston rod 4 is in engagement with a spherically-shaped socket formed in one end of a brake shoe 6. The brake shoe 6 has a brake lining 7 secured thereto which is engageable with a suitable brake drum 8. Each end of cylinder 1 is provided with a circumferential groove which receives a boot retaining member 9 for holding one end of a flexible boot 10 in engagement with the cylinder, and the opposite end of the boot externally snugly surrounds the open end of thimble 5 and is clamped thereto by means of a clamping ring 11.

The heat which is generated by the engagement of the brake shoe lining 7 with the rotating drum 8, is conducted to the brake shoe 6 some of which is then conducted to the piston rod 4. The greater portion of the heat conducted to the rod 4 is dissipated into air in the space between the piston rod 4 and thimble 5, thence passes to the atmosphere, thereby preventing its transference to boot 10.

During the motion of brake shoe 6 and its lining 7 toward the brake drum 8, the end of rod 4 that engages thimble 5 goes through a limited amount of vertical motion represented by the lines A and B which are drawn from the radius of the semi-spherical end of piston rod 4. The snug fit between the closed semi-spherical end of the thimble 5 and piston rod 4 causes both to move together so that the spaced relationship between thimble 5 and the piston rod 4 is maintained constant and uniform, thus preventing the direct conduction of heat from piston rod 4 to thimble 5 and thence to boot 10.

Fig. 2 shows a wheel cylinder 14 provided with a pair of pistons 15 and associated packing cups 16, only one each of the pistons and cups being illustrated. Each piston is provided with a wear plate 21 and abutting the wear plate is the closed end of thimble 17 whose other end is open and which end extends beyond the end of cylinder 14. A circumferential groove is provided at each end of the wheel cylinder to receive a bead formed on one end of boot 18 and whose opposite end is received in a bracket 19 secured to the outside of thimble 17 adjacent to its open end.

The brake assembly is provided with a brake shoe 22 one end of which is tapered to form a piston engaging rod and which snugly fits in the closed end of the tubular thimble 17 in order to move in unison therewith. The brake shoe is provided with a lining 23 that is engageable with the brake drum 24, as is customary in the art.

The heat that is generated when the brake lining 23 engages drum 24, especially during repeated applications of the lining 23 to drum 24, is conducted to the brake shoe 22, some of which is transferred to the piston rod formed on the shoe and by reason of the air gap provided between thimble 17 and the piston rod end of the brake shoe, the major portion thereof is dissipated from the brake shoe into the air in the air gap and thence to the atmosphere without being transferred to the boot, thereby preserving its effectiveness. By reason of the snug fit between the thimble and the end of the brake shoe, the space between the thimble and the shoe is maintained constant during the operation of the brake even though the thimble may move relative to the piston. At no time will the piston rod on the shoe come into contact with the thimble at its open end.

What I claim is:

1. A brake operating mechanism comprising an open ended cylinder; a piston in said cylinder; an annular closure of heat sensitive material one end of which engages the open end of said cylinder; a brake shoe having an element extending through said closure into said open end and actuated by said piston; and a member mounted on said element and having a portion engaging the other end of said closure and spaced from said element for preventing transference of heat from said element to said annular closure.

2. A brake mechanism comprising an open ended cylinder; a piston in said cylinder; closure means formed from a heat sensitive material for enclosing the open end of said cylinder; a brake shoe having an element operatively associated therewith that extends through said closure into said open end and actuated by said piston; and a thimble mounted on said element having a portion engaging said closure and spaced from said element for preventing transference of heat from said element to said annular closure.

3. A brake operating mechanism comprising an open ended cylinder; a piston in said cylinder; an annular closure of heat sensitive material for the open end of said cylinder; a brake shoe; a rod extending through the open end of said cylinder, said rod extending through said closure and actuated by said piston and in engagement with said shoe; and a longitudinally extended thimble provided with a closed end that is snugly fitted on said rod and in engagement with said piston said thimble and rod movable as a unit relative to said piston, said thimble having an open end received in said closure and whose walls are spaced from said rod over a major portion of the length thereof for preventing transference of heat from said rod to said annular closure.

4. A brake operating mechanism comprising an open ended cylinder; a piston in said cylinder; an annular closure of heat sensitive material for the open end of said cylinder; a brake shoe; brake shoe engaging means extending through said closure actuated by said piston; and a longitudinally extended thimble mounted on said engaging means and having a portion snugly receiving said annular closure, said thimble having an internal dimension over the major portion of its length that is greater than the external dimension of said engaging means, said thimble and engaging means movable as a unit relative to said piston, thereby providing an air space in said thimble for dissipating heat to atmosphere derived from the brake shoe engaging means.

5. A brake operating mechanism comprising an open ended cylinder; a piston in said cylinder; a longitudinally extended thimble having a small diameter at its closed end and a larger diameter at its open end, the smaller end being in engagement with said piston; a piston rod actuated by said piston and disposed in and snugly fitting in the smaller end of said thimble, the diameter of the rod being smaller than the diameter of the open end of said thimble to provide a space between said rod and said thimble, said thimble and rod movable as a unit relative to said piston; and a flexible boot for closing the open end of said cylinder that extends between the open end thereof and the open end of said thimble.

6. A brake shoe operating mechanism comprising an open ended cylinder; a piston in said cylinder; an annular boot of heat sensitive material one end of which engages the open end of said cylinder; a brake shoe; means extending between said brake shoe and piston and actuated by said piston; a longitudinally extended thimble engaging the other end of said boot and mounted on the portion of said means that engages said piston and spaced from said means, said thimble and said means movable as a unit relative to said piston; means for securing said boot to the open end of said cylinder; and means for securing said boot on said thimble.

7. A brake operating mechanism comprising an open ended cylinder; a piston in said cylinder; a flexible annular boot of heat sensitive material for the open end of said cylinder; a brake shoe; a rod actuated by said piston, said rod extending through said boot and engaging said shoe; a longitudinally extended thimble mounted on said rod and spaced therefrom, said thimble and rod movable as a unit relative to said piston, said thimble engaging said boot; means for securing said boot to the open end of said cylinder; and means for securing said boot to said thimble.

8. A brake operating mechanism comprising an open ended cylinder; a piston in said cylinder; a flexible annular boot of heat sensitive material for the open end of said cylinder; a brake shoe; a rod actuated by said piston, said rod extending through said boot and engaging said shoe; a longitudinally extended thimble one end of which is mounted on and snugly fitting one end of said rod for preventing relative movement between said rod and thimble, said rod spaced from said thimble and the other end of said thimble engaging said boot and movable with said thimble as a unit relative to said piston; means for securing said boot to the open end of said cylinder; and means for securing said boot to said thimble.

9. A brake operating mechanism comprising an open-ended cylinder; a piston in said cylinder; an annular closure of heat sensitive material for the open end of said cylinder; a brake shoe; a rod extending through the open end of said cylinder, said rod extending through said closure and actuated by said piston and in engagement with said shoe; and a longitudinally extended thimble of thin metal having a closed end in engagement with the piston and mounted in fixed relation coaxially with respect to said rod, said thimble having an open end received in said closure, the walls of the thimble being spaced from said rod over a major portion of the length thereof for preventing transfer of heat from said rod to said annular closure, said thimble and rod movable as a unit relative to said piston.

10. A brake operating mechanism comprising an open-ended cylinder; a piston in said cylinder; an annular closure of heat sensitive material for the open end of said cylinder; a brake shoe; brake shoe engaging means extending through said closure actuated by said piston; a longitudinally extended thimble of thin metal having a closed end and provided with two coaxial cylindrical portions of different diameter fixedly mounted on said engaging means, the larger diameter portion of the thimble snugly receiving said annular closure, the smaller diameter portion snugly receiving said engaging means, said thimble having an internal diameter over the major portion of its length greater than that of said engaging means, thereby providing an air space in said thimble for dissipating heat to atmosphere from the brake shoe engaging means, said thimble and brake shoe engaging means movable as a unit relative to said piston.

11. A brake operating mechanism comprising an open-ended cylinder; a piston in said cylinder; a longitudinally extended thimble of thin metal having a smaller diameter at its closed end and a larger diameter at its open end, the smaller end being in engagement with said piston; a cylindrical piston rod actuated by said piston and snugly fitted into the smaller end of said thimble, the diameter of the rod being smaller than the diameter of the open end of said thimble for providing an air space between said rod and said thimble, said thimble and rod movable as a unit relative to said piston; and a flexible boot for closing the open end of said cylinder that extends between the open end thereof and the open end of said thimble.

WALTER REAMS FREEMAN.

REFERENCES CITED

The following references are of record in the file of this patent:

UNITED STATES PATENTS

| Number | Name | Date |
|---|---|---|
| 1,912,218 | Pentz | May 30, 1933 |
| 2,093,557 | Heidloff | Sept. 21, 1937 |
| 2,102,851 | La Brie | Dec. 21, 1937 |
| 2,197,452 | Fussell, Jr. | Apr. 16, 1940 |
| 2,280,134 | Thomas | Apr. 21, 1942 |